(12) United States Patent
Shin et al.

(10) Patent No.: US 7,702,845 B2
(45) Date of Patent: Apr. 20, 2010

(54) METHOD AND APPARATUS FOR MANAGING BLOCKS ACCORDING TO UPDATE TYPE OF DATA IN BLOCK-TYPE MEMORY

(75) Inventors: Hee-sub Shin, Suwon-si (KR);
Moon-sang Kwon, Seoul (KR);
Chan-kyu Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 11/699,461

(22) Filed: Jan. 30, 2007

(65) Prior Publication Data
US 2007/0198769 A1    Aug. 23, 2007

(30) Foreign Application Priority Data
Feb. 17, 2006    (KR) .................... 10-2006-0015711

(51) Int. Cl.
G06F 13/00    (2006.01)
(52) U.S. Cl. .................... 711/103; 711/156; 711/159; 711/163
(58) Field of Classification Search ................ 711/103, 711/156, 159, 163
See application file for complete search history.

(56) References Cited

U.S. PATENT DOCUMENTS 4,630,086 A * 12/1986 Sato et al. .............. 365/185.06
5,892,706 A * 4/1999 Shimizu et al. .............. 365/145
5,991,193 A * 11/1999 Gallagher et al. ............ 365/171
7,139,864 B2 * 11/2006 Bennett et al. ............... 711/103
7,173,863 B2 * 2/2007 Conley et al. .......... 365/189.05
7,433,993 B2 * 10/2008 Sinclair ...................... 711/103
7,509,471 B2 * 3/2009 Gorobets .................... 711/203
2005/0144516 A1 * 6/2005 Gonzalez et al. ............... 714/8
2005/0251617 A1 * 11/2005 Sinclair et al. ............... 711/103
2006/0059297 A1 * 3/2006 Nakanishi et al. ........... 711/103
2007/0156998 A1 * 7/2007 Gorobets .................... 711/170

FOREIGN PATENT DOCUMENTS

| JP | 2000-112814 A | 4/2000 |
|---|---|---|
| JP | 2002-008382 A | 1/2002 |
| KR | 10-2001-0029171 A | 4/2001 |
| KR | 10-2004-0072875 A | 8/2004 |

* cited by examiner

Primary Examiner—Reba I Elmore
(74) Attorney, Agent, or Firm—Sughrue Mion, PLLC

(57) ABSTRACT

A method and an apparatus are provided for managing blocks according to the update type of data in block-type memory. The method includes receiving data to be stored from an application; determining an update frequency of the data; extracting information of nonvolatile memory space in which the data will be stored according to the update frequency of the data; and transmitting information about the data and the space to the nonvolatile memory so that the data is stored in the space using information of the extracted space.

17 Claims, 8 Drawing Sheets

METHOD AND APPARATUS FOR MANAGING BLOCKS ACCORDING TO UPDATE TYPE OF DATA IN BLOCK-TYPE MEMORY

CROSS-REFERENCE TO RELATED APPLICATION

This application is based on and claims priority from Korean Patent Application No. 10-2006-0015711 filed on Feb. 17, 2006 in the Korean Intellectual Property Office, the disclosure of which is incorporated herein in its entirety by reference.

BACKGROUND OF THE INVENTION

1. Field of the Invention

Methods and apparatuses consistent with the present invention relate to storing data in nonvolatile memory, and more particularly, to managing blocks according to the update type of data in block-type memory.

2. Description of the Related Art

In the related art, flash memory is impact resistant and has a low power consumption, and has been used as storage in mobile devices and embedded systems.

Generally, NAND flash memory is divided into a page consisting of a 512-byte (1 sector) or 2048-byte (4 sectors) data area and a 16-byte or 64-byte backup area, and a block that has bound several pages as one bundle. One NAND flash memory consists of multiple blocks. To carry out a write operation on an already-written page, the NAND flash memory must perform an erase operation that erases the whole block to which the sector belongs. Further, the number of times each block can be erased is related to the lifetime of the NAND flash memory, and thus all blocks of the NAND flash memory should be evenly used.

To provide linear space, in which reading and writing is possible in sector units, such as in a hard disk, flash memory needs a separate Flash Translation Layer (FTL) because of the different physical structure. The FTL converts a requested logical address into a physical address on flash memory in upper application.

In a related art FTL that uses a mapping method, logically-consecutive sectors can be recorded in different physical positions. Because an erasing unit is bigger than a writing unit in the NAND flashy memory, when reaching a certain limit, the work of collecting consecutive data dispersed in different physical positions into the same address space using random blocks is called merging.

FIG. 1 illustrates a merging operation of a flash memory. As shown in blocks LSN #512-#767, data, which physically needs to exist within the same block has been physically dispersed in two or more blocks. The dispersed data is copied to the same physical block 10 (a merging operation).

Further, a file system is an application operated in the upper layer of the FTL; it records predetermined data about a certain logical address in the FTL or reads recorded data. Because such a file system has been designed for magnetic disks such as a hard disk or a floppy disk, characteristics of the aforementioned related art flash memory are not reflected well. For example, correction of data recorded on a magnetic disk can be achieved only by writing new data to the position where the existing data was recorded. However, in the case of NAND flash memory, the work of invalidating conversion information on the page, on which the existing data has been recorded, writing new data to the new page, then correcting the conversion information should be performed due to the physical characteristics of the memory. Hence, frequent data-correction requests sent to the FTL will cause frequent merging operations.

FIG. 2 illustrates block space of related art flash memory. A file system in the memory space (shown by reference numeral 15) is produced by formatting. Address space on a disk is divided into space where metadata to manage data of a file system is recorded, and block space. As shown by reference numeral 20, block space is divided into data blocks that include one or more sectors, and as shown by reference numeral 25, and blocks data are managed by the file system.

The file system calculates the size of file-system metadata, which is necessary for managing the whole storage space in the formatting process as shown by reference numeral 15, then allocates space for the file-system metadata, and allocates remaining space as block space.

The file system allocates usable data blocks so as to add a new file or record content of a file. A newly-allocated data block is indicated as a data block "in use" by the file system.

As described above, the file system allocates the entire storage space by storing file-system metadata and data to be recorded by the upper application.

However, such data is often differs in the access pattern. For example, the file-system metadata is small compared with regular data, and is often edited. Further, regular data is relatively large, but after being recorded the data is not often edited compared with the file-system metadata.

Hence, frequently-corrected data and rarely-corrected data are scattered in the storage space. If different types of data exist in the same block of the NAND flash, the block can frequently be the object of merging. Such frequent merging may lower the total performance of the file system, and may reduce the lifetime of flash memory.

Therefore, there is a need for a method and apparatus for effectively using flash memory considering data access or characteristics of recording.

SUMMARY OF THE INVENTION

The present invention provides a method and apparatus that stores data in flash memory reflecting recording characteristics of the flash memory.

The present invention also provides a method of managing blocks in a file system, which minimizes the occurrence of merging operations of flash memory, and minimizes overhead of the merging operations.

According to an exemplary embodiment of the present invention, there is provided a method of managing blocks according to the update type of data in block-type memory, the method including receiving data to be stored from an application; determining the update frequency of the data; extracting information of nonvolatile memory space in which the data will be stored according to the update frequency of the data; and transmitting information about the data and the space to the nonvolatile memory so that the data is stored in the space using information of the extracted space.

According to an exemplary embodiment of the present invention, there is provided an apparatus including a storage-combination unit that transmits data to nonvolatile memory or receives data of the nonvolatile memory, and communicates with the nonvolatile memory; a file-system unit that receives data to be stored from an application, determines the update frequency of the data, and extracts information of nonvolatile memory space in which the data will be stored; and a control unit that transmits information about the data and the space to the storage-combination unit so that the data is stored in the space using information of the extracted space.

BRIEF DESCRIPTION OF THE DRAWINGS

The above and other aspects of the present invention will become apparent by describing in detail exemplary embodiments thereof with reference to the attached drawings, in which.

DETAILED DESCRIPTION OF THE EXEMPLARY EMBODIMENTS

Figure 1:
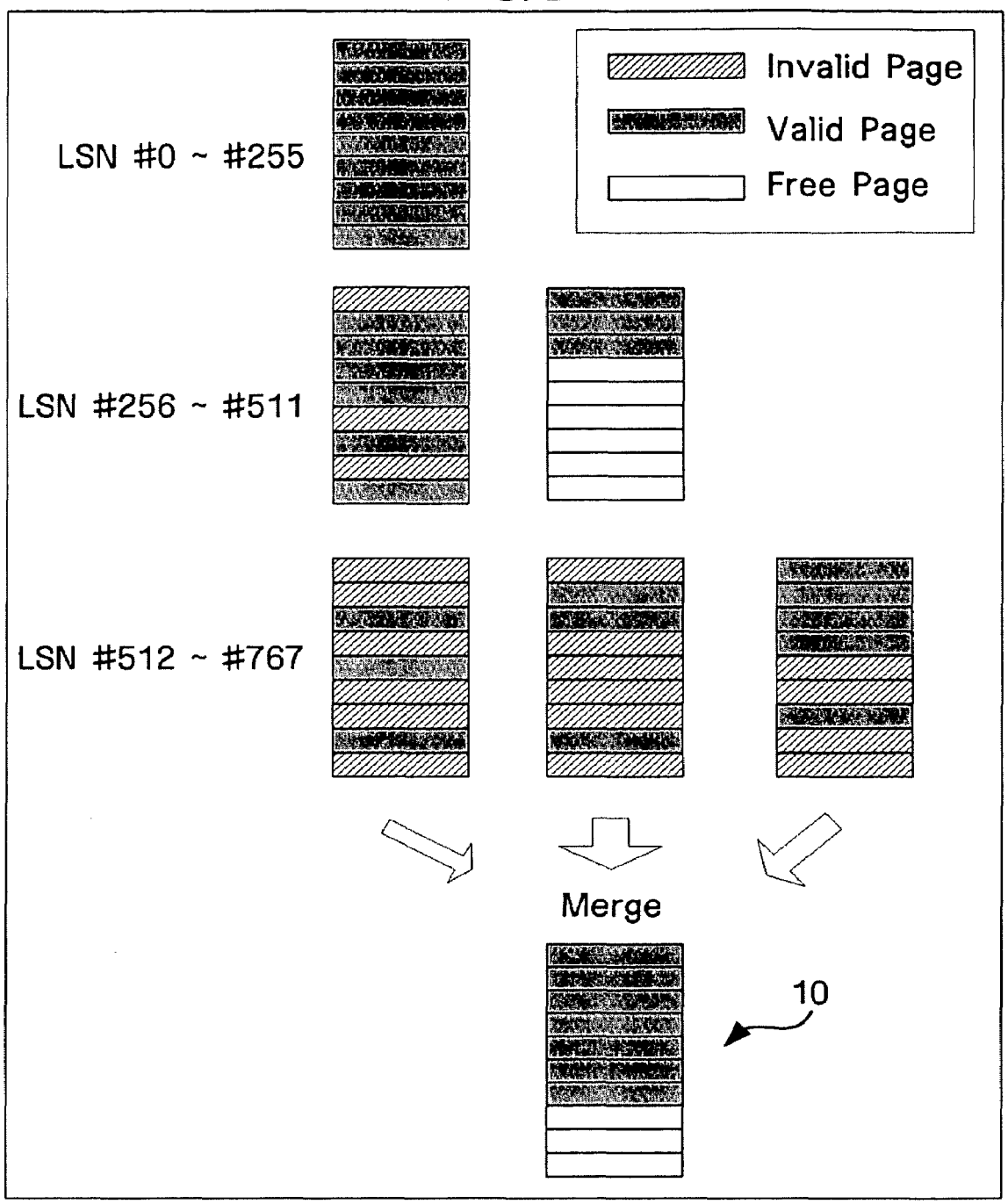
FIG. 1 illustrates a merging operation that occurs in flash memory.
Figure 2:
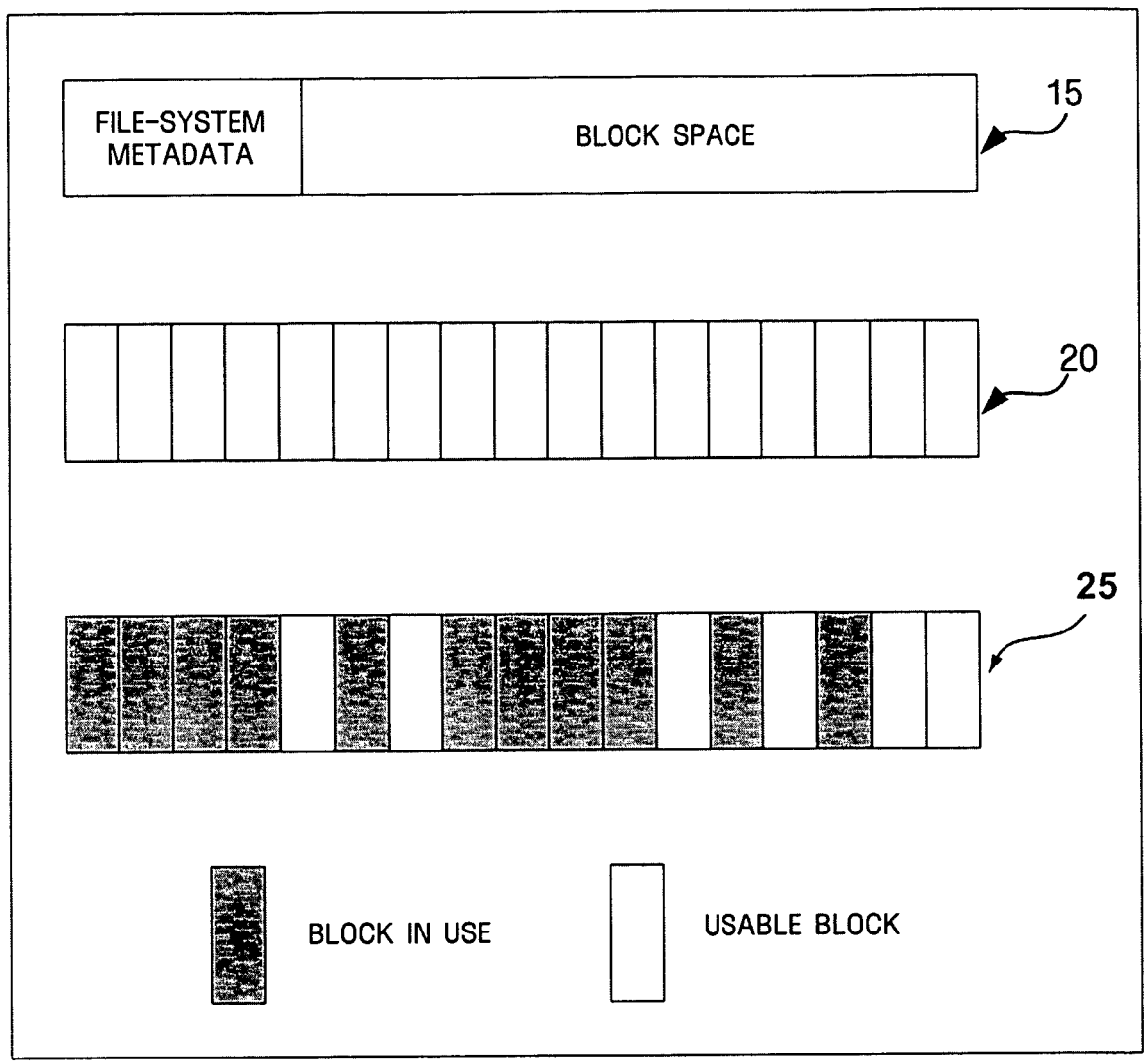
FIG. 2 illustrates block space of related art flash memory.

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The exemplary embodiments are described hereinafter with reference to flowchart illustrations of user interfaces, methods, and computer program products. It should be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause operational steps to be performed in the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). In some alternative implementations, the functions noted in the blocks may occur out of the illustrated order without departing from the scope of the invention. For example, two blocks shown in succession may in fact be executed substantially concurrently or in reverse order, depending upon the functionality involved.

The exemplary embodiments are directed to the NAND flash memory, but the present invention is not limited thereto, and can be applied to any type of memory that performs an erase operation before storing data.

In the present specification, a file system is managed so that two kinds of data, which exist in the file system and have very different access patterns, can be located in substantially different physical positions in the flash memory.

Figure 3:
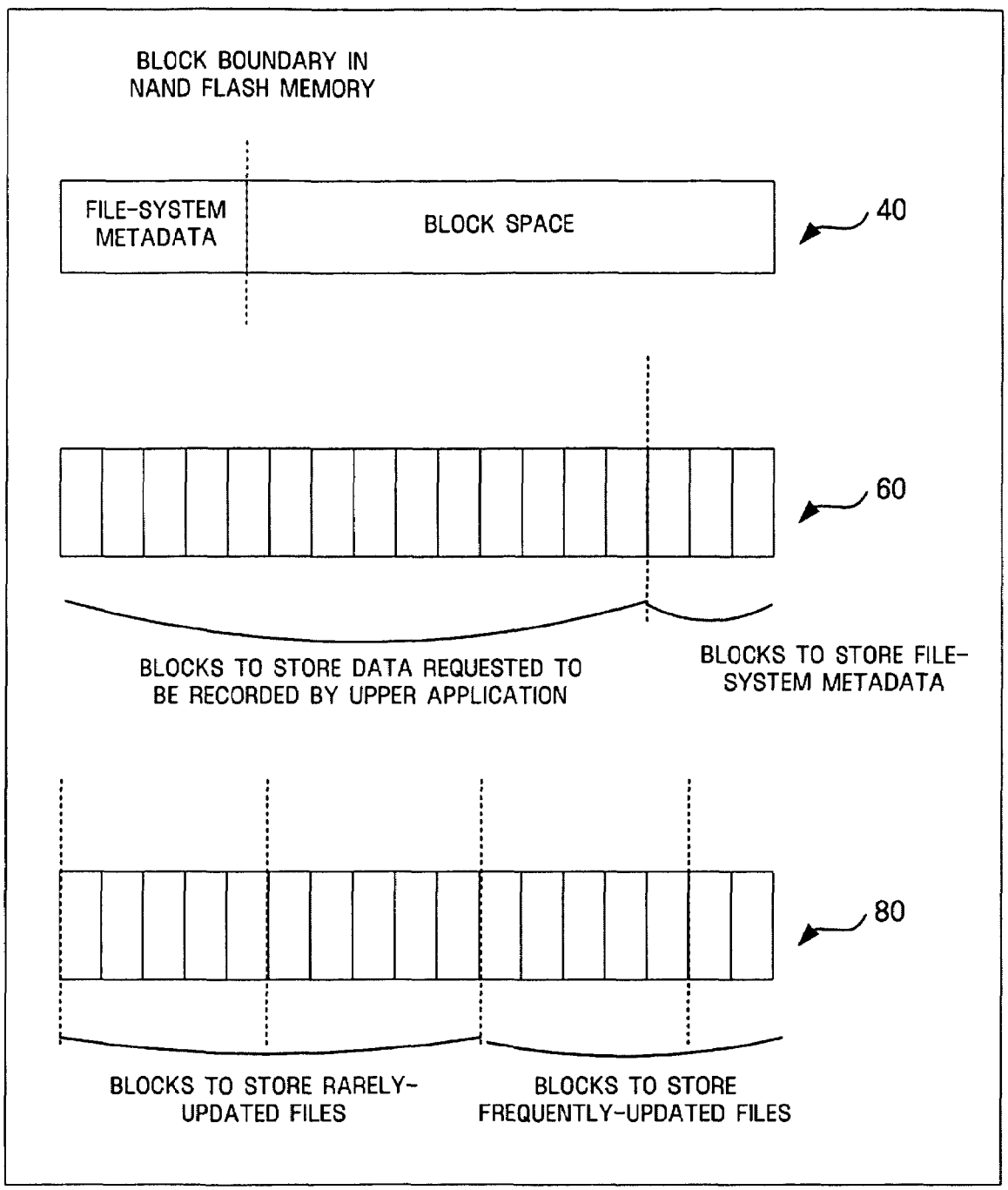
FIG. 3 illustrates an example of dividing blocks according to an exemplary embodiment of the present invention.

FIG. 3 illustrates an example of dividing blocks according to an exemplary embodiment of the present invention. This process, which is called formatting, initializes data structure of a file system, and records the structure in the storage. The entire storage space is managed by considering its size. The size and the position of necessary metadata are determined, and the initial value is recorded in the storage. The file system is used by adding a new file or allocating free data blocks for recording the content of the file. Data requested to be recorded by file system metadata or the upper application can be stored in the data block.

While file-system metadata is relatively small and is often updated, user data is substantially large, read consecutively, and not often updated until erased. Hence, as shown by reference numeral 60 in FIG. 3, data to be often updated, such as file-system metadata, and data to be less often updated are separated and then allocated. The process of data being separated and then allocated can be determined in the formatting process. As shown by reference numeral 60 in FIG. 3, by positioning metadata in an independent block in the NAND flash memory, unnecessary merging by frequent updates of metadata does not occur. In other words, by separately storing metadata in units where merging occurs, merging independently occurs in data blocks where metadata are stored.

The exemplary embodiment is not limited to file-system metadata processing. As shown by reference number 80, when mass-produced, if once recorded, a block for data to be rarely updated and a block for storing a file to be often added, erased, and modified by a user can be allocated in substantially different blocks in flash memory.

If the attribute of a file is read-only, the file can be stored in a block for rarely-updated files. Such a setting can be determined considering extension of the file and characteristics of the application, as well as the attributes of the file.

Figure 4:
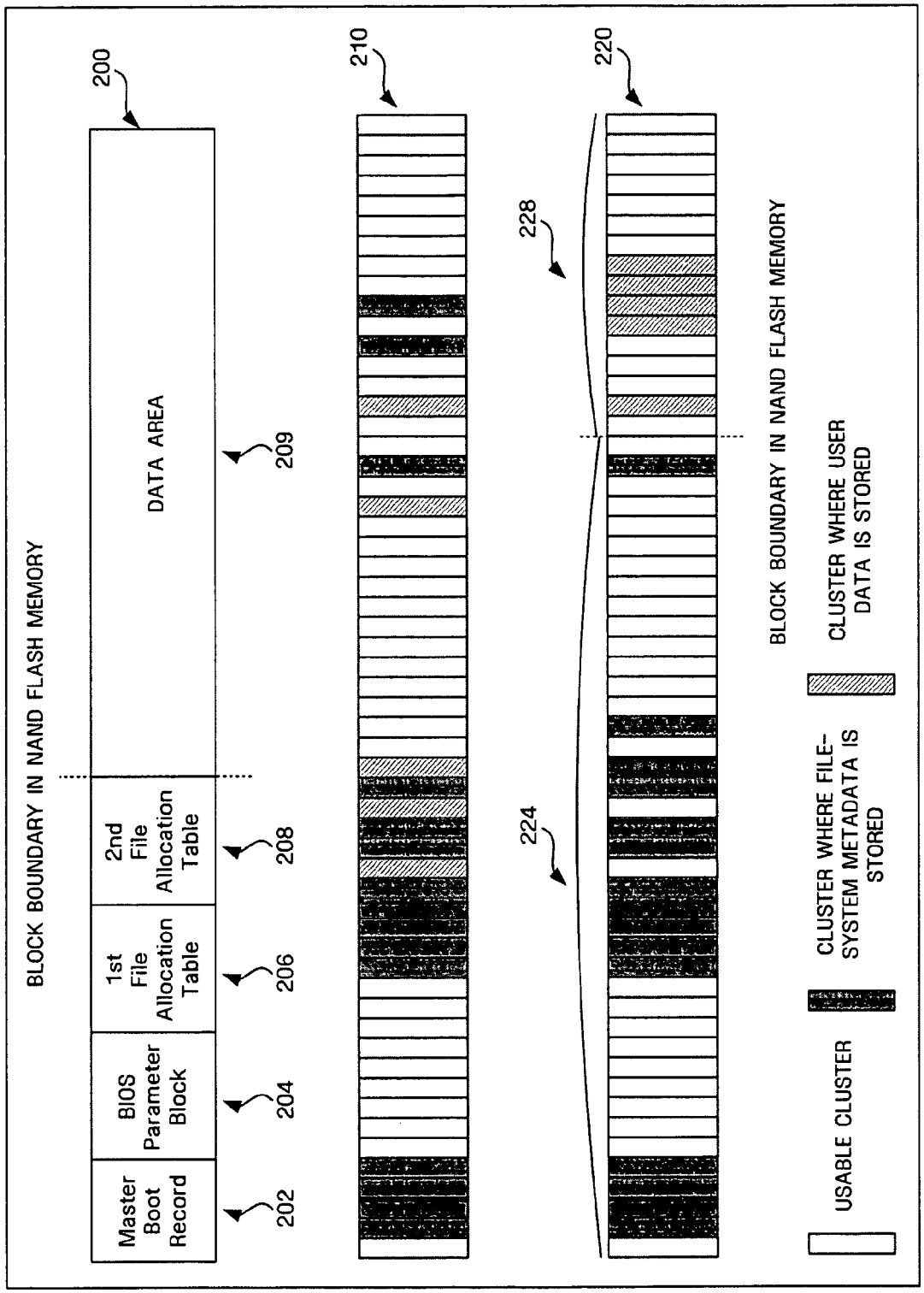
FIG. 4 illustrates an example of allocating a cluster in which user data is stored and a cluster in which file system metadata is stored according to an exemplary embodiment of the present invention.

FIG. 4 illustrates an example of allocating a cluster in which user data is stored and a cluster in which file-system metadata is stored according to an exemplary embodiment of the present invention.

Reference numeral 200 in FIG. 4 shows a layout of a disk drive formatted to the FAT file system. The disk drive consists of a Master Boot Record (MBR) 202, a BIOS Parameter Block (BPB) 204, a first FAT 206, a second FAT 208, and a data area 209. One cluster can constitute one block, or a multiple of clusters can constitute one block.

As shown by reference numeral 210, the data is stored in the related art way. Clusters where file system metadata and user data are stored have been dispersed. The data area 209 is divided into clusters, which are the allocation unit that binds one or more sectors. The cluster becomes a basic unit where a file system records data. As shown by reference numeral 210, clusters in the data area consist of clusters where data is stored and available clusters where data has not been recorded (free clusters). Further, clusters where data is stored are divided into clusters where file system metadata is stored and clusters where user data is stored. However, because such clusters are dispersed, blocks or clusters, which need not be updated, can be updated. To such an occurrence, a structure shown by reference numeral 220 can be formed.

Reference numeral 220 shows a way of allocating blocks of a file system. An FAT file system allocates free clusters in the data area in order to store data. Blocks can be allocated so that clusters 228 to store file-system metadata and clusters 224 to store data requested to be recorded by the upper application can be positioned in different blocks in the NAND flash memory. Hence, merging operations by frequent updates of metadata can be substantially minimized.

Figure 5:
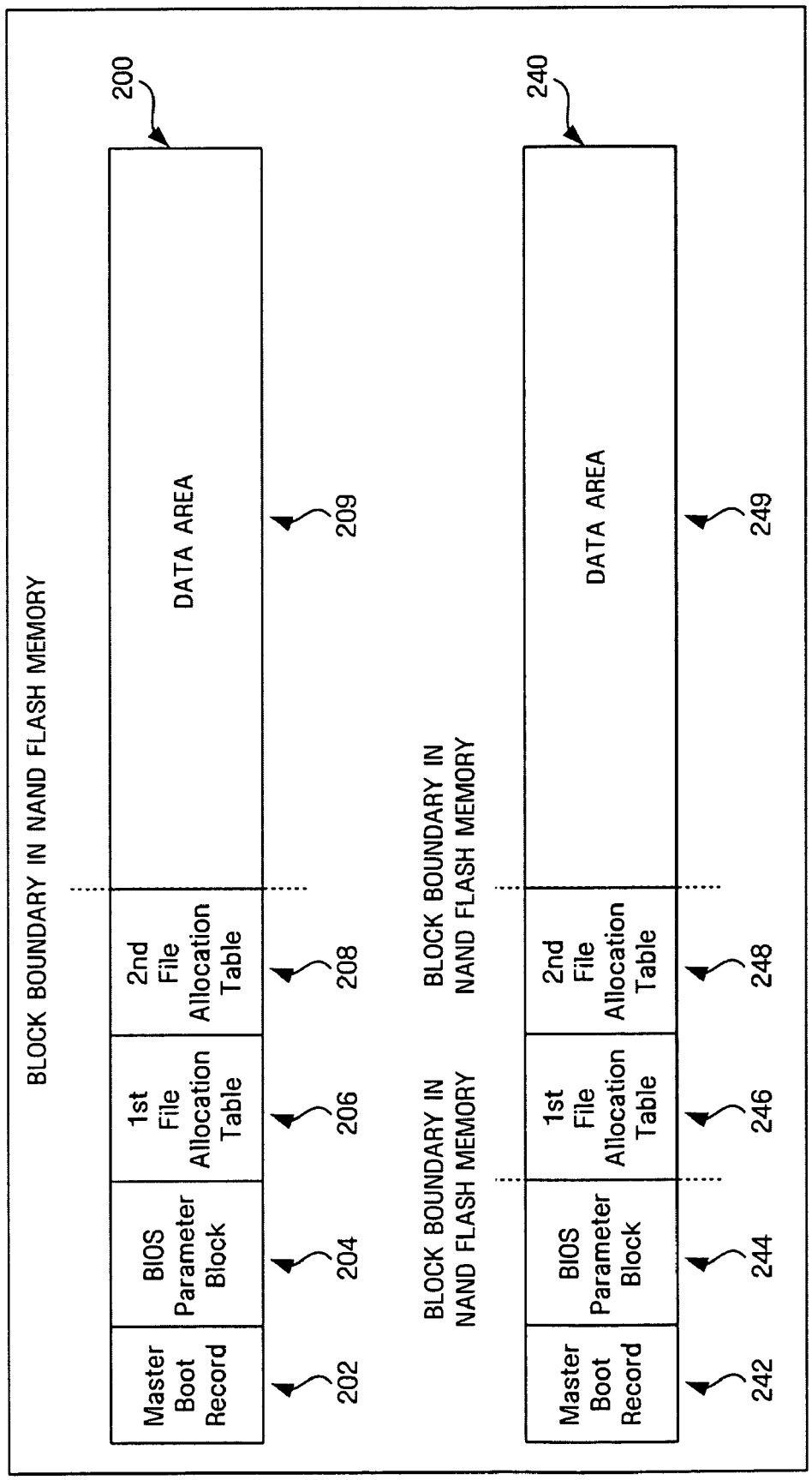
FIG. 5 illustrates an example of constituting a file system so that the File Allocation Table (FAT) is allocated to an independent block on the NAND flash memory according to an exemplary embodiment of the present invention.

FIG. 5 illustrates an example of constituting a file system so that the FAT is allocated to an independent block on the NAND flash memory according to an exemplary embodiment of the present invention.

A related art file system forms the boundary by dividing into a data area and a file system area, but according to the present exemplary embodiment, frequently-updated FAT parts are stored in an independent block.

In other words, a file system is formatted so that frequently-updated FAT is positioned as an independent block in the NAND flash memory. As such, as the FAT 246 and 248 is positioned in a block in the NAND flash memory, which is different from the MBR 242, the BPB 244, and the data area 249, the merging by frequent updates of the FAT area can be minimized.

Figure 6:
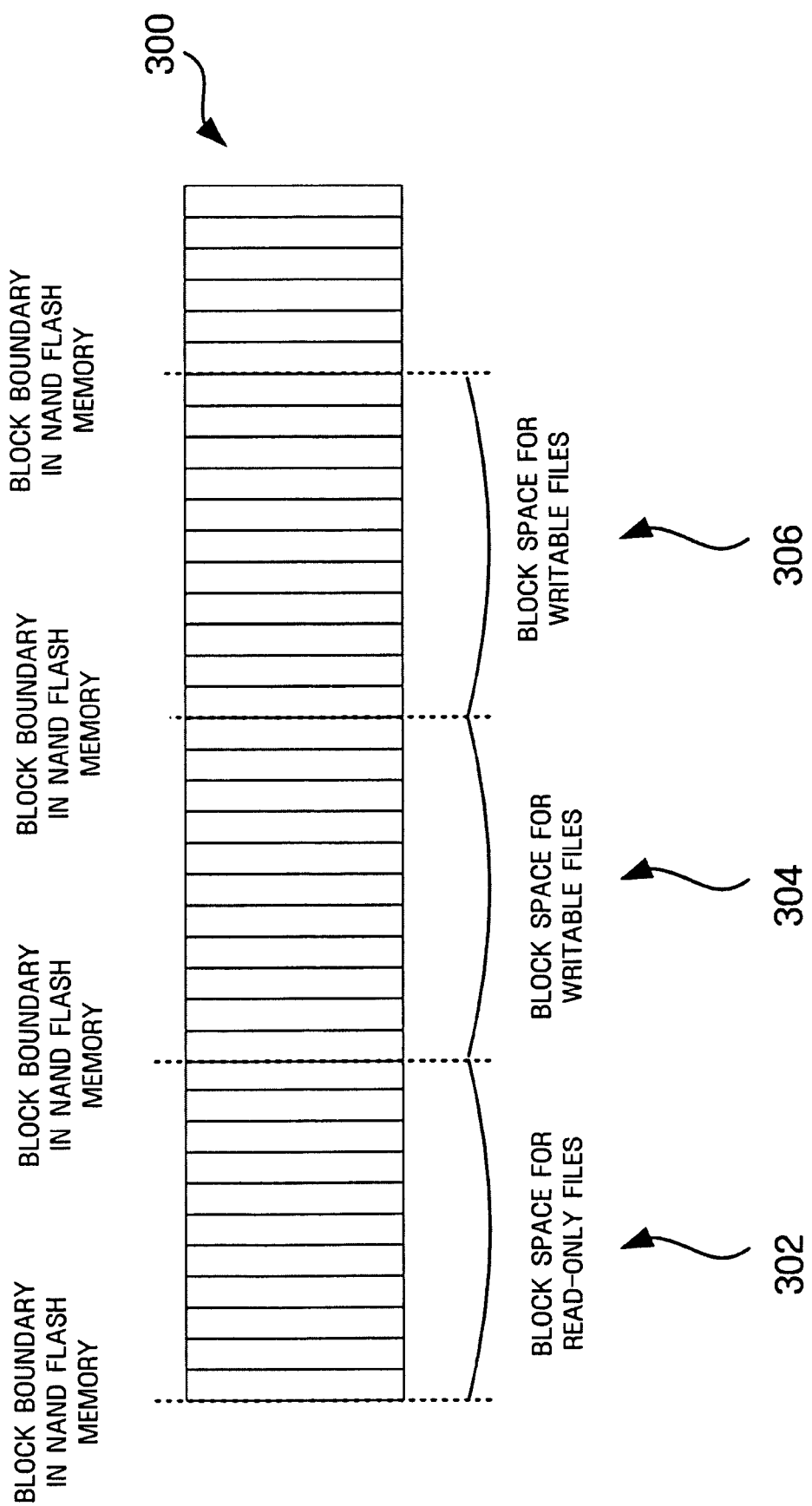
FIG. 6 illustrates a case of allocating blocks considering the update frequency according an exemplary embodiment of the present invention.

FIG. 6 illustrates a case of allocating blocks considering update frequency according an exemplary embodiment of the present invention. To store content of flies in a file system, space for blocks to be frequently corrected and space for files to be rarely corrected when blocks are allocated are divided. Block space such as reference numerals 302, 304, and 306 is positioned within flash memory 300. There is block space 302 for read-only files, and block space 304 and 306 for storing recordable files.

As an example of using divided space, once recorded when mass-produced like an operation system file, rarely-updated files are allocated to the block space 302 for read-only files, and files such as user data, which are frequently added, erased, and corrected, are allocated to other block space 304, 306 which is different from the block space 302 to which read-only files are allocated.

The term "unit" used in this embodiment refers to a hardware element such as a Field Programmable Gate Array (FPGA) or an Application Specific Integrated Circuit (ASIC), and "unit" executes certain roles. "Unit" can be constituted to exist in addressing-possible storage media, or can be constituted to regenerate one or more processors. For example but not by way of limitation, "unit" can include software elements, object-oriented software elements, class elements, task elements, processes, functions, attributes, procedures, circuits, data, database, data structures, tables, arrays, and variables. Elements and functions provided in "units" can be combined into fewer elements or "units", or can be divided into additional elements and 'units'. In addition, the components and units may be implemented so as to execute one or more central processing units (CPUs) in a device.

Figure 7:
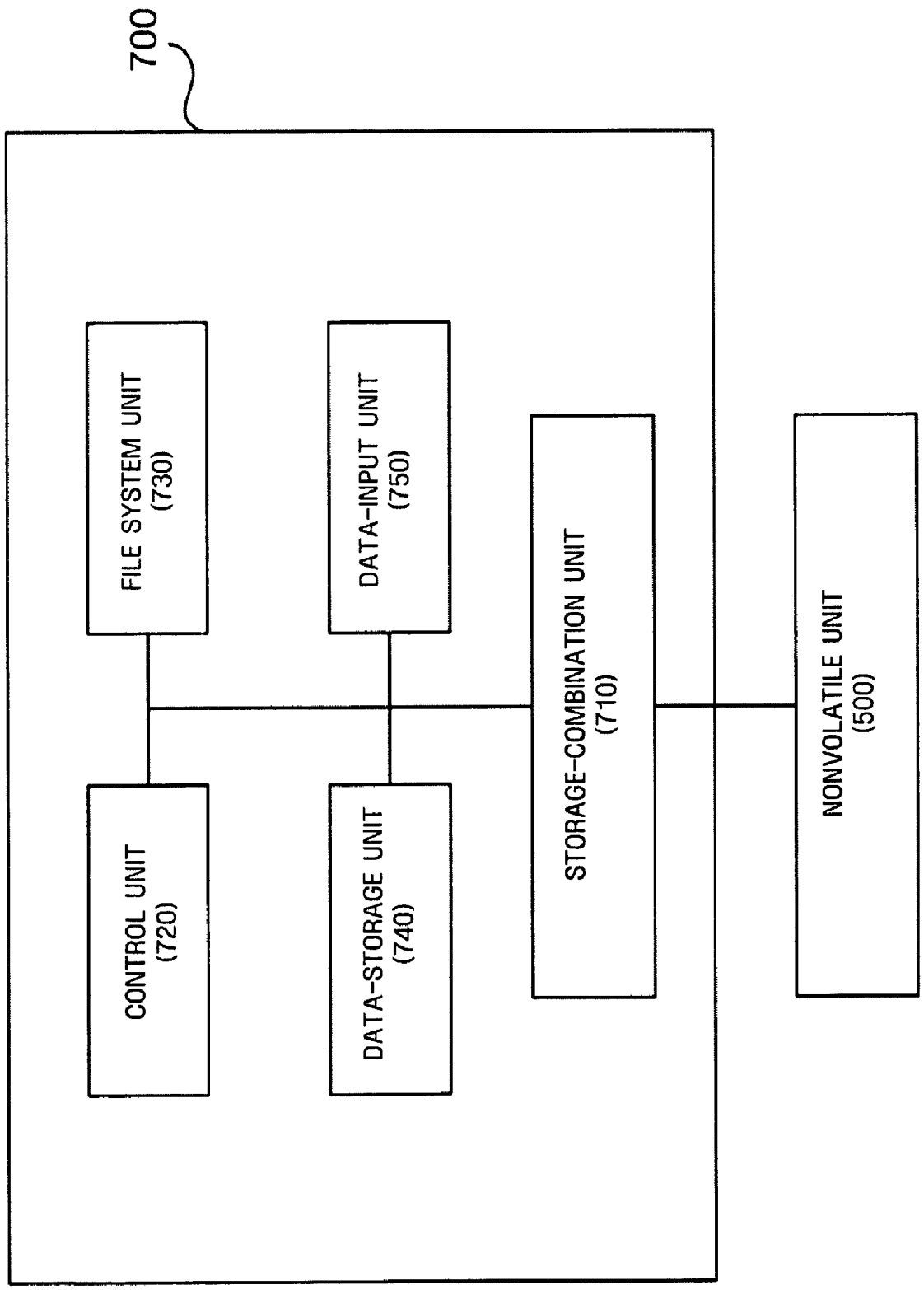
FIG. 7 is illustrates a structure of an apparatus 700 for storing data in different blocks depending on update frequency of a flash memory according to an exemplary embodiment of the present invention.

FIG. 7 illustrates a structure of an apparatus 700 for storing data in different blocks depending on update frequency in flash memory according to an exemplary embodiment of the present invention. The structure of FIG. 7 can be applied to any device that stores data in flash memory, such as a mobile phone, a personal digital assistant (PDA), a personal computer (PC), a portable multimedia player (PMP), a digital camera, a handheld PC, or a notebook computer. However, the present invention is not limited thereto, and other devices as envisioned by one skilled in the art may be substituted for the foregoing devices.

The structure of the apparatus 700 can include a control unit 720, a file-system unit 730, a storage-combination unit 710, and a nonvolatile storage 500. The structure may further include a data-storage unit 740 and a data-input unit 750.

The nonvolatile device 500 can be embedded as an apparatus 700, or can exist as a removable memory card. In some portable digital devices, both types are supported.

The storage-combination unit 710 transmits data to nonvolatile memory or receives data of the nonvolatile memory, and contacts the nonvolatile memory or the nonvolatile storage 500. The file-system unit 730 receives data to be stored from an application, determines the update frequency of the data, and then secures nonvolatile memory or nonvolatile storage 500, in which the data is stored depending on the update frequency of the data. The control unit 720 transmits data and information about the space to the storage-combination unit 710 so that data is stored in the space using the extracted information about the space. The data-storage unit 740 is where data to be stored in the nonvolatile storage 500 is stored; the data-input unit 750 receives data from an external source.

If data to be stored in the nonvolatile storage 500 is frequently updated, the file-system unit 730 can extract information of space of frequently-updated blocks. Data is stored using extracted space information. A case where data constitutes the FAT is an example of a case of frequent updating.

Further, in the case where data is read-only, the file-system unit 730 can extract space information of rarely-updated blocks. The data is stored using the extracted space information.

The file-system unit 730 can format space of the nonvolatile storage 500 depending on the update frequency.

The nonvolatile storage 500 performs erasures before storing data, as well as merging two or more storage units. The NAND flash memory is an example of a nonvolatile storage.

Figure 8:
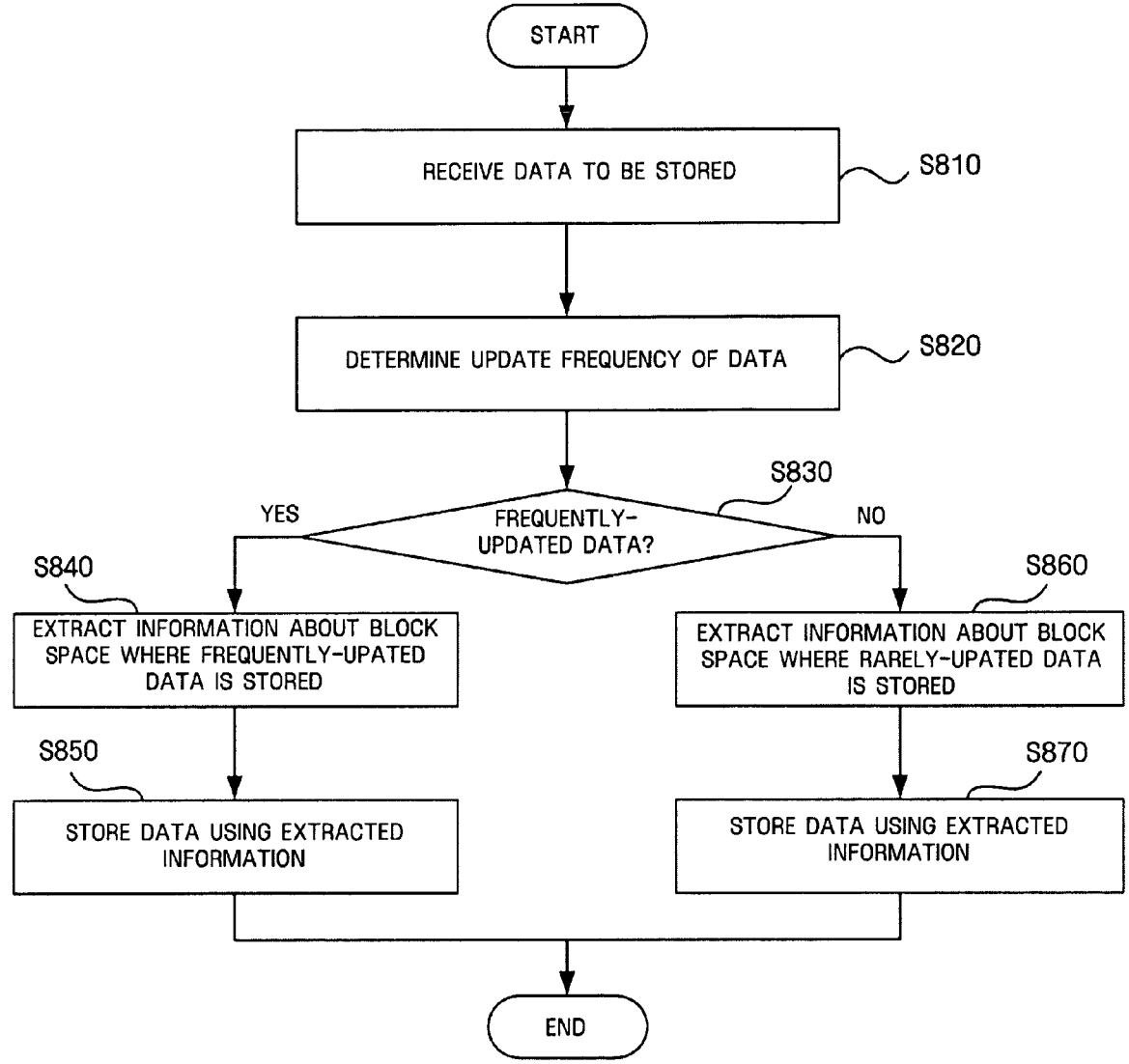
FIG. 8 illustrates a process of storing data depending on the update frequency according to an exemplary embodiment of the present invention.

FIG. 8 illustrates a process of storing data depending on update frequency according to an exemplary embodiment of the present invention.

A file system receives data to be stored from an application (S810). The update frequency of the received data is determined (S820), e.g., whether the data is frequently-updated data is judged. In the case of the FAT data, the update frequency may be high. Further, in the case of data constituting read-only files, the update frequency may be low. In the case of frequently-changed data (S830), information about block space where frequently-updated data is stored is extracted (S840). Data is stored according to the extracted information (S850).

In the case of rarely-updated data, information about block space where rarely-updated data is stored is extracted (S860). Data is stored according to the extracted information (S870).

Through the operations of the process of FIG. 8, blocks can be managed according to the update type of data in block-type memory, e.g., the NAND flash memory. Further, nonvolatile memory needs to be erased before storing data, and merges may need to be performed on two or more storage units.

Further, though not shown in FIG. 8, before extracting information about space of nonvolatile memory, the dividing of the space of the nonvolatile memory according to the update frequency can be further included, and formatting is an example of such work.

The method and apparatus of the present invention may have the following advantages.

First, the merging process may be reduced by positioning frequently-updated data and rarely-updated data in different blocks of memory space.

Second, memory speed may be improved by substantially reducing the amount of time merging requires when storing data.

It should be understood by those of ordinary skill in the art that various replacements, modifications and changes may be made in the form and details without departing from the spirit and scope of the present invention as defined by the following claims. Therefore, it is to be appreciated that the above described exemplary embodiments are for purposes of illustration only and are not to be construed as limitations of the invention.

What is claimed is:

1. A method of managing blocks according to an update frequency of data in a block-type memory, the method comprising:
    receiving data to be stored from an application;
    determining the update frequency of the data;
    dividing a single nonvolatile memory into a plurality of spaces according to the update frequency;
    extracting information about one of the plurality of spaces within the nonvolatile memory that is configured to store data with the update frequency; and
    transmitting the data and the extracted information to the nonvolatile memory so that the data is stored in the one of the plurality of spaces of the nonvolatile memory.

2. The method of claim 1, wherein if the update frequency is higher than a level, the extracting extracts information about a frequently-updated block of the nonvolatile memory.

3. The method of claim 2, wherein the data comprises a file allocation table.

4. The method of claim 1, wherein if the data is read-only, the extracting extracts information about rarely-updated blocks of the nonvolatile memory.

5. The method of claim 1, wherein the dividing comprises formatting a space within the nonvolatile memory to set a file allocation table area.

6. The method of claim 1, further comprising erasing the nonvolatile memory before storing the data, and merging at least two storage units.

7. An apparatus comprising:
    a storage-combination unit that transmits data to a single nonvolatile memory or receives data from the nonvolatile memory, and contacts the nonvolatile memory;
    a file-system unit that receives data to be stored from an application, determines an update frequency of the data, divides the nonvolatile memory into a plurality of spaces according to the up date frequency, and extracts information about one of the plurality of spaces within the nonvolatile memory that is configured to store data with the update frequency; and
    a control unit that transmits the data and the extracted information to the storage-combination unit so that the data is stored in the one of the plurality of spaces of the nonvolatile memory.

8. The apparatus of claim 7, wherein if the update frequency is higher than a level, the file-system unit extracts information about frequently-updated blocks of the nonvolatile memory.

9. The apparatus of claim 8, wherein the data comprises a file allocation table.

10. The apparatus of claim 7, wherein if the data is read-only, the file-system unit extracts information rarely-updated blocks of the nonvolatile memory.

11. The apparatus of claim 7, wherein the file-system unit formats a space of the nonvolatile memory in order to set a file allocation table area.

12. The apparatus of claim 7, wherein the nonvolatile memory is erased before storing the data, and at least two storage units are merged.

13. A computer readable medium storing a set of instructions for performing a method of managing blocks according to an update frequency of data in a block-type memory, the method comprising:
    receiving data to be stored from an application;
    determining the update frequency of the data;
    dividing a single nonvolatile memory into a plurality of spaces according to the update frequency;
    extracting information about one of the plurality of spaces within the nonvolatile memory that is configured to store data with the update frequency; and
    transmitting the data and the extracted information to the nonvolatile memory so that the data is stored in the one of the plurality of spaces of the nonvolatile memory.

14. The computer readable medium of claim 13, wherein if the update frequency is higher than a level, the extracting extracts information about a frequently-updated block of the nonvolatile memory.

15. The computer readable medium of claim 13, wherein if the data is read-only, the extracting extracts information about rarely-updated blocks of the nonvolatile memory.

16. The computer readable medium of claim 13, wherein the dividing comprises formatting a space within the nonvolatile memory to set a file allocation table area.

17. The computer readable medium of claim 13, further comprising erasing the nonvolatile memory before storing the data, and merging at least two storage units.

* * * * *